Jan. 14, 1958   J. J. ADAMIC ET AL   2,819,842
WHEEL-OPERATED COUNTING MECHANISM
Filed Aug. 2, 1954   2 Sheets-Sheet 1
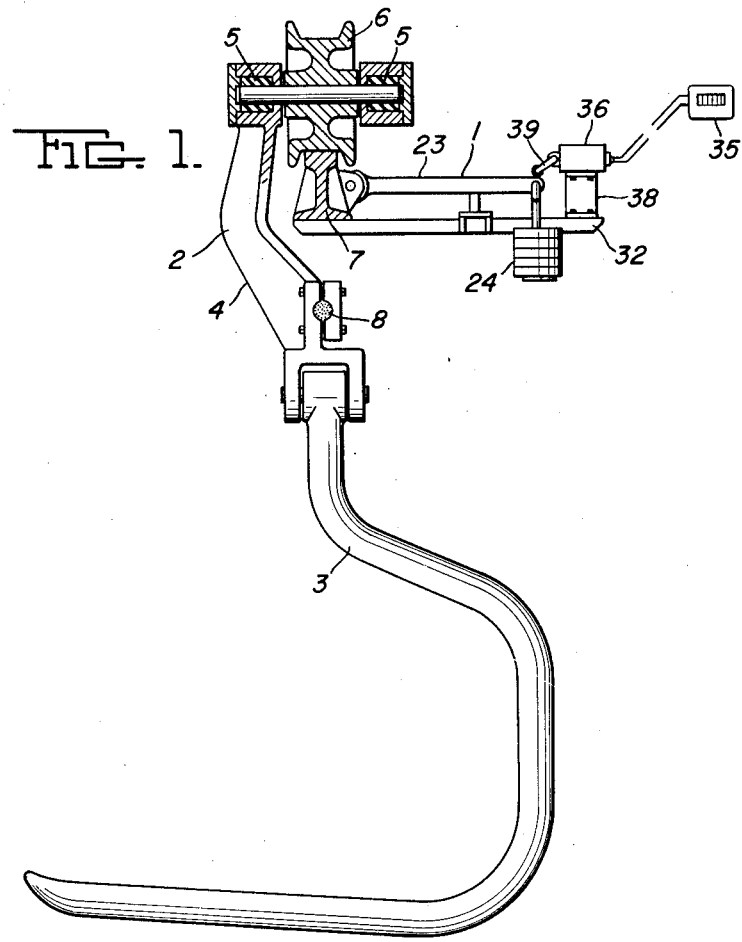
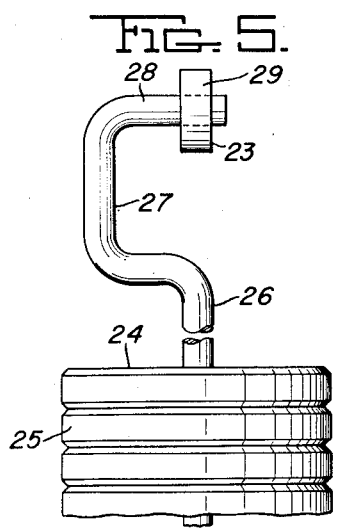
INVENTORS:
JOHN J. ADAMIC and
CHARLES P. PETTIGREW,
BY: Donald G. Dalton
their Attorney.

Jan. 14, 1958 J. J. ADAMIC ET AL 2,819,842
WHEEL-OPERATED COUNTING MECHANISM
Filed Aug. 2, 1954 2 Sheets-Sheet 2
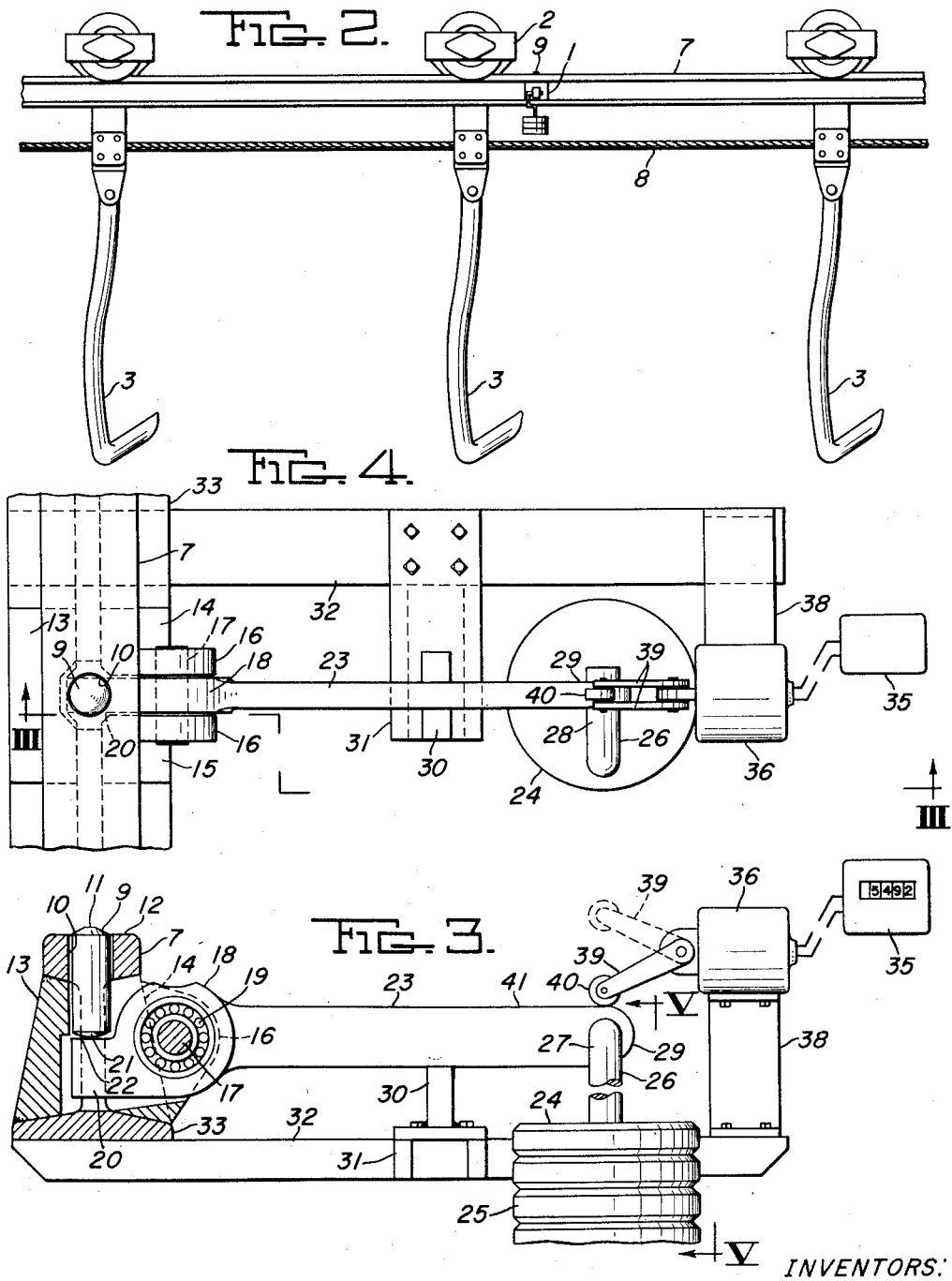
INVENTORS:
JOHN J. ADAMIC and
CHARLES P. PETTIGREW,
BY: Donald G. Dalton
their Attorney.

United States Patent Office 2,819,842
Patented Jan. 14, 1958

2,819,842
WHEEL-OPERATED COUNTING MECHANISM

John J. Adamic, Joliet, and Charles P. Pettigrew, Elwood, Ill., assignors to United States Steel Corporation, a corporation of New Jersey Application August 2, 1954, Serial No. 447,296

4 Claims. (Cl. 235—98)

This invention relates, as indicated, to a wheel-operated counting mechanism, and, more particularly, to a counting mechanism for continuous conveyor systems which is capable of distinguishing between loaded and unloaded conveyors and which will count only the loaded conveyors passing thereover.

In the transportation of bundles of rod and the like from a mill to shipping or storing facilities, it is common practice to provide continuously operated trolley conveyors having an endless chain of conveyors or trolley-carried supporting hooks on which bundles may be placed for movement. The supporting hooks have a uniform spacing relative to each other and are provided with trolley wheels at their upper ends for rolling engagement with a rail or trackway. It is of course desirable to count the number of bundles transported for delivery to customers or to storage facilities. However, conventional forms of counting mechanisms are unsuitable for this purpose since they are incapable of distinguishing between the empty and loaded supporting hooks which are moving continuously over the supporting rail or trackway of the conveyor system.

One of the principal objects of this invention is to provide a counting mechanism which is capable of distinguishing between empty and loaded conveyors in a continuous conveyor system and which will count only the loaded conveyors passing thereover.

A further object is to provide a counting mechanism for continuous conveyor systems of the character referred to which includes a depressible plunger projecting into the path of movement of the conveyor wheels over the conveyor rail and which is depressible only by the wheel of a loaded conveyor passing thereover, the wheels of empty conveyors rolling over the plunger without imparting movement thereto.

Another object of the invention is to provide a conveyor wheel actuated operating member for a counting mechanism with a bias for preventing its operation by the wheels of empty conveyors.

A further object of the invention is to provide a counting mechanism having a conveyor wheel-operated plunger with a counterweighted lever for preventing operation of the plunger by the wheels of empty conveyors and which will allow its operation to actuate the counting mechanism only in response to the wheels of loaded conveyors moving thereover.

Other objects and advantages of the invention will be apparent from the following description.

In the drawings, there is shown a preferred embodiment of the invention. In this showing:

Figure 1 is a transverse sectional view of a monorail conveyor showing in elevation the arrangement of a trolley supporting hook and the counting mechanism of this invention with respect thereto;

Figure 2 is a side elevational view of a portion of the conveyor system shown in Figure 1 and showing the arrangment of a plurality of supporting hooks with respect thereto;

Figure 3 is an enlarged detail view taken along the line III—III of Figure 4 showing the counting mechanism of this invention in mounted position relative to the rail or trackway of a conveyor system;

Figure 4 is a top plan view of the apparatus shown in Figure 3; and

Figure 5 is a fragmentary end elevational view looking in the direction of the line V—V in Figure 3 and showing the mounting of the counterweight with respect to the biasing and operating lever.

In Figures 1 and 2 of the drawings, the counting mechanism of this invention is designated as a whole by the numeral 1 and is illustrated as applied to an endless trolley conveyor 2. The conveyor 2 comprises a plurality of hooks 3 on which bundles of coiled rod and the like may be placed for movement thereby. Each of the hooks 3 is secured at its upper end to a bracket 4 having spaced bearings 5 mounting a trolley wheel 6 for rolling engagement over the trackway or trolley rail 7. The brackets 4 are connected at uniformly spaced intervals, as shown in Figure 2, with a cable 8 which is operated in conventional manner to move the bracket supported hooks 3 along the trolley rail 7.

As best shown in Figures 3 and 4 of the drawings, the counting mechanism of this invention includes an actuating plunger 9 which is received and has sliding movement in a vertical opening 10 extending downwardly from the tread surface of and through the web of the rail 7. In its normal undepressed position, the plunger 9 has an upper portion 11 which projects above the rail tread surface 12 over which the trolley wheels 6 have rolling engagement. Reinforcing blocks 13, 14 and 15 are welded to the tread and flange of the rail at points adjacent the opening 10. As shown in Figure 4, the blocks 14 and 15 are spaced from each other to provide access to the opening 10, and their adjacent ends are provided with flanges 16 in which opposite ends of a pivot shaft 17 are respectively secured.

A lever 18 is mounted by a roller-bearing assembly 19 for pivotal movement on the shaft 17. The lever 18 has one arm 20 projecting inwardly into the portion of the opening 10 extending through the web of the rail 7. The plunger 9 has its lower end 21 terminating short of the bottom of the opening 10 and engaged with the upper surface 22 of the lever arm 20. The lever 18 also has an outwardly projecting arm 23 of relatively greater length having a counterweight assembly 24 connected with its outer end. The counterweight assembly comprises a plurality of weights 25 mounted on a shaft 26. The shaft 26 has a U-shaped hook 27 (see Figure 5) at its upper end, the horizontal arm 28 of which is pivotally received in an opening in the outer end 29 of the lever 23 to provide a pivotal connection of the counterweight assembly 24 therewith.

The counterweight assembly 24 biases the pivotal movement of the lever 23 to a position engaged with a stop 30 mounted on a bracket 31 projecting outwardly from a channel 32 secured to the underside of the rail flange 33. In this position of the lever 23, its inwardly extending arm 20 holds the actuating plunger 9, as illustrated in Figure 3, with its upper end portion 11 projecting slightly above the tread surface 12 of the rail 7. In this position, the upper portion 11 of the plunger 9 is in the path of movement of the conveyor wheels 6 over the rail 7 and will be depressed downwardly to impart a counter-clockwise movement to the lever 18 whenever the downward force exerted by a wheel rolling thereover is effective to overcome the biasing force of the weights 25 in the assembly 24. The number of weights 25 in the assembly 24 is adjusted in accordance with the weight of the bundles to be carried by the hooks 3 so that the plunger 9 is depressed only when a wheel supporting a loaded hook passes thereover. In this manner, movement of a wheel carrying an empty hook over the upwardly extending portion 11 of the plunger 9 is ineffective to impart a downward movement to the plunger 9. The distance which the portion 11 projects above the wheel tread surface 12 is made such that it is ineffective to cause derailing of wheels carrying empty hooks as they roll thereover.

To count the number of loaded hooks moving over the plunger 9, a counter, schematically illustrated and designated by the numeral 35, is provided. The counter 35 is actuated by operation of a limit switch 36 mounted on a bracket 38 extending outwardly from the supporting channel 32. The limit switch has an actuating arm 39 extending outwardly over the end 29 of the lever arm 23 and has a roller 40 at its outer end engaged with the upper surface 41 of the lever arm 23. The limit switch actuating arm 29 has a spring bias (not shown) for maintaining its roller engaged with the surface 41.

Whenever the plunger 9 is depressed in response to a wheel carrying a loaded hook moving thereover, the lever arm 23 is moved in a counter-clockwise direction, and the switch actuating arm 39 is pivoted to the position shown in dotted lines, this movement being effective to actuate the limit switch 36 and thus operate the electrical counter 35. As soon as the wheel carrying the loaded hook moves by the plunger 9, the bias of the counterweight 24 on the lever 23 is effective to return the parts to their relative positions as shown in Figure 3 for a subsequent counting operation in a similar manner.

From the foregoing, it will be apparent that the counting mechanism of this invention is effective to count the loaded conveyors moving by the actuating plunger 9. Attention is particularly directed to the fact that the bias against movement of the plunger 9 provided by the counterweight assembly 24 is effective to render the counting mechanism capable of distinguishing between empty and loaded conveyor hooks and operates in such manner that the apparatus counts only the loaded conveyor hooks moving along the rail 7.

While one embodiment of our invention has been shown and described it will be apparent that other adaptations and modifications may be made without departing from the scope of the following claims.

We claim:

1. In a conveyor system including both empty and loaded conveyors, a trackway, and wheels supporting the conveyors for movement over said trackway, an apparatus for counting the loaded conveyors moving over said trackway comprising an actuating member normally occupying a position lying in the path of movement of conveyor wheels over said trackway and mounted for movement from said position to an actuated position by the action of a conveyor wheel moving thereover, a biasing lever having a pair of oppositely projecting arms with a pivotal support located at the junction of said arms, one of said arms being engaged with and movable by said actuating member and the other of said arms having biasing means resisting pivotal movement of said lever by said actuating member, said biasing means being effective through said lever to exert a biasing force against said actuating member greater than the weight of empty conveyors but less than the weight of loaded conveyors so that the wheels of empty conveyors moving over said actuating member are ineffective to move it to its actuated position, and a counter including operating mechanism therefor actuated by said lever upon movement thereof by said actuating member for counting the loaded conveyors passing over said trackway.

2. An apparatus as defined in claim 1 characterized by said biasing means comprising an adjustable counterweight suspended from the other end of said other lever arm.

3. In a conveyor system including conveyors, a trackway, and wheels supporting the conveyors for movement over said trackway, an apparatus for counting the loaded conveyors moving over said trackway comprising, a rail forming part of said trackway and having a tread surface over which said conveyor wheels roll and having an opening extending vertically downwardly from said tread surface, an actuating member mounted for vertical movement in said opening and having a lower end spaced from the bottom of said opening, a lever having a pivotal support at a point intermediate its ends, one end of said lever projecting into said opening and having engagement with said lower end of said actuating member, biasing means engaged with the other end of said lever for biasing its movement to a limited position in which its said one end holds said actuating member with its upper end projecting above said tread surface, said biasing means applying a biasing force to said member against downward movement thereof greater than the weight of empty conveyors but less than the weight of loaded conveyors so that it is moved downwardly and imparts pivotal movement to said lever against the action of said biasing force only by the wheels of loaded conveyors moving thereover, and means responsive to pivotal movement of said lever by said actuating member for counting the number of loaded conveyors moving over said trackway.

4. In a conveyor system including conveyors, a trackway, and wheels supporting the conveyors for movement over said trackway, an apparatus for counting the loaded conveyors moving over said trackway comprising, a rail forming part of said trackway and having a tread surface over which said conveyor wheels roll and having an opening extending vertically downwardly from said tread surface, an actuating member mounted for vertical movement in said opening and having a lower end spaced from the bottom of said opening, a lever having a pivotal support at a point intermediate its ends, one end of said lever projecting into said opening and having engagement with said lower end of said actuating member whereby downward movement of said actuating member imparts pivotal movement to said lever, a counterweight suspended from the other end of said lever and effective through said lever to bias the movement of said member upwardly in said opening to a position in which its upper end projects above said tread surface and with a force such that said member is moved downwardly only by the wheels of a loaded conveyor rolling over said tread surface, and means responsive to pivotal movement of said lever by said actuating member for counting the number of loaded conveyors moving over said trackway.

References Cited in the file of this patent
UNITED STATES PATENTS

| 1,513,811 | Heinold | Nov. 4, 1924 |
| 1,769,639 | Gustafson | July 1, 1930 |
| 2,017,404 | Lorig | Oct. 15, 1935 |

FOREIGN PATENTS

| 21,386 | Austria | Sept. 25, 1905 |